United States Patent
Li et al.

(10) Patent No.: US 10,838,702 B2
(45) Date of Patent: Nov. 17, 2020

(54) ANALYZING AND OPTIMIZING CONTAINER IMAGES IN CLOUD COMPUTING

(71) Applicant: International Business Machines Corporation, Armonk, NY (US)

(72) Inventors: Guang Cheng Li, Beijing (CN); Yuan Wang, Beijing (CN); Xiao Xi Liu, Beijing (CN); Jian Ma, Beijing (CN); Lin Yang, Beijing (CN); Jing Min Xu, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 90 days.

(21) Appl. No.: 16/185,376

(22) Filed: Nov. 9, 2018

(65) Prior Publication Data
US 2020/0150940 A1 May 14, 2020

(51) Int. Cl.
*G06F 9/45* (2006.01)
*G06F 8/41* (2018.01)

(52) U.S. Cl.
CPC .............. *G06F 8/447* (2013.01); *G06F 8/443* (2013.01)

(58) Field of Classification Search
CPC ........................................ G06F 8/443–8/447
USPC ................................................ 717/150–157
See application file for complete search history.

(56) References Cited

U.S. PATENT DOCUMENTS

| | | | | |
|---|---|---|---|---|
| 6,745,384 B1 * | 6/2004 | Biggerstaff | ........... | G06F 8/4441 712/203 |
| 7,805,706 B1 * | 9/2010 | Ly | ........................ | G06F 9/5083 717/121 |
| 8,561,038 B1 * | 10/2013 | Sams | ....................... | G06F 8/30 717/107 |
| 8,782,637 B2 * | 7/2014 | Khalid | ..................... | G06F 8/61 718/1 |
| 9,122,562 B1 * | 9/2015 | Stickle | ............... | G06F 11/3409 |
| 9,177,210 B2 * | 11/2015 | King | ........................ | G06K 9/18 |
| 9,367,305 B1 * | 6/2016 | Kumar | ...................... | G06F 8/30 |
| 9,626,166 B1 * | 4/2017 | Alewine | ................. | G06F 21/53 |
| 9,756,050 B1 * | 9/2017 | Brandwine | ........... | H04L 63/102 |
| 9,888,067 B1 * | 2/2018 | Yemini | ................ | G06F 9/5077 |
| 9,986,031 B2 * | 5/2018 | Jain | ..................... | H04L 67/1095 |
| 10,002,247 B2 * | 6/2018 | Suarez | ............... | G06F 9/45558 |

(Continued)

OTHER PUBLICATIONS

Zhang et al, "Container Oriented Job Scheduling Using Linear Programming Model", IEEE, pp. 174-180 (Year: 2017).*

(Continued)

*Primary Examiner* — Anil Khatri
(74) *Attorney, Agent, or Firm* — Amin, Turocy & Watson, LLP

(57) ABSTRACT

Computer technology facilitating optimization of a container image is provided. In one example, a computer-implemented method includes: analyzing a source container image to obtain a content of the source container image and building an initial target container image using a set of base image layers based on the content of the source container image. The computer-implemented method also includes determining content difference between the initial target container image and the source container image, and building a final target container image based on the initial target container image and the content difference.

17 Claims, 8 Drawing Sheets

(56) References Cited

U.S. PATENT DOCUMENTS

| | | | |
|---|---|---|---|
| 10,339,332 B1* | 7/2019 | Bendory | G06F 8/447 |
| 10,459,823 B1* | 10/2019 | Lieberman | G06F 11/362 |
| 10,691,816 B2* | 6/2020 | Aronovich | G06F 21/6209 |
| 10,725,775 B2* | 7/2020 | Suarez | G06F 9/45558 |
| 2017/0177860 A1 | 6/2017 | Suarez et al. | |
| 2017/0220329 A1 | 8/2017 | Yang et al. | |
| 2018/0046446 A1 | 2/2018 | Turovsky et al. | |
| 2018/0096005 A1 | 4/2018 | Nagaraja et al. | |
| 2018/0121485 A1 | 5/2018 | Jayanthi et al. | |
| 2019/0310872 A1* | 10/2019 | Griffin | G06F 9/544 |

OTHER PUBLICATIONS

Xu et al, "Mining Container Image Repositories for Software Configuration and Beyond", ACM, pp. 49-52 (Year: 2018).*

Syed et al, "The Secure Software Container Pattern", ACM, pp. 1-7 (Year: 2017).*

Nathan et al, "CoMICon: A Co-operative Management System for Docker Container Images", IEEE, pp. 116-126 (Year: 2017).*

Nardelli et al, "Elastic Provisioning of Virtual Machines for Container Deployment", ACM, pp. 5-10 (Year: 2017).*

Pahl et al, "A Container-based Edge Cloud PaaS Architecture based on Raspberry Pi Clusters", IEEE, pp. 117-124 (Year: 2016).*

Cito et al, "An Empirical Analysis of the Docker Container Ecosystem on GitHub", IEEE, pp. 323-333 (Year: 2017).*

Leija et al, "Reproducible Containers", ACM, pp. 167-182 (Year: 2020).*

Gholami et al, "A Framework for Satisfying the Performance Requirements of Containerized Software Systems Through Multi-Versioning", ACM, pp. 150-160 (Year: 2020).*

Kang et al., "Container and Microservice Driven Design for Cloud Infrastructure DevOps," IEEE International Conference on Cloud Engineering (IC2E), Apr. 2016, pp. 202-211, IEEE, 10 pages.

Mell et al., "The NIST Definition of Cloud Computing," National Institute of Standards and Technology, Sep. 2011, Special Publication 800-145, U.S Department of Commerce, 7 pages.

* cited by examiner

ANALYZING AND OPTIMIZING CONTAINER IMAGES IN CLOUD COMPUTING

BACKGROUND

The subject disclosure relates to computer technology, and more specifically, to computer technology facilitating optimization of a container image.

SUMMARY

According to an embodiment of the present invention, there is provided a computer-implemented method that facilitates optimization of container image. The computer-implemented method comprises analyzing, by the one or more processing units, a source container image to obtain a content of the source container image. and building, by the one or more processing units, an initial target container image using a set of base image layers based on the content of the source container image. The computer-implemented method also comprises: determining, by the one or more processing units, a content difference between the initial target container image and the source container image, and building, by the one or more processing units, a final target container image based on the initial target container image and the content difference.

According to another embodiment of the present invention, there is provided a computer system. The computer system comprises: a memory that stores computer executable components; and a processor, operably coupled to the memory, and that executes the computer executable components stored in the memory. The computer executable components can comprise: at least one computer-executable component that: analyzes a source container image to obtain a content of the source container image and builds an initial target container image using a set of base image layers, based on the content of the source container image. The computer executable components can also determine a content difference between the initial target container image and the source container image, and build a final target container image based on the initial target container image and the content difference.

According to still another embodiment of the present invention, there is provided a computer program product. The computer program product facilitates optimization of a container image. The computer program product comprises a computer readable storage medium having program instructions embodied therewith. The program instructions can be executable by a processor to cause the processor to: analyze, by the processor, a source container image to obtain a content of the source container image, and build, by the processor, an initial target container image using a set of base image layers, based on the content of the source container image. The program instructions can also be executable by the processor to cause the processor to determine, by the processor, a content difference between the initial target container image and the source container image, and build, by the processor, a final target container image based on the initial target container image and the content difference.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
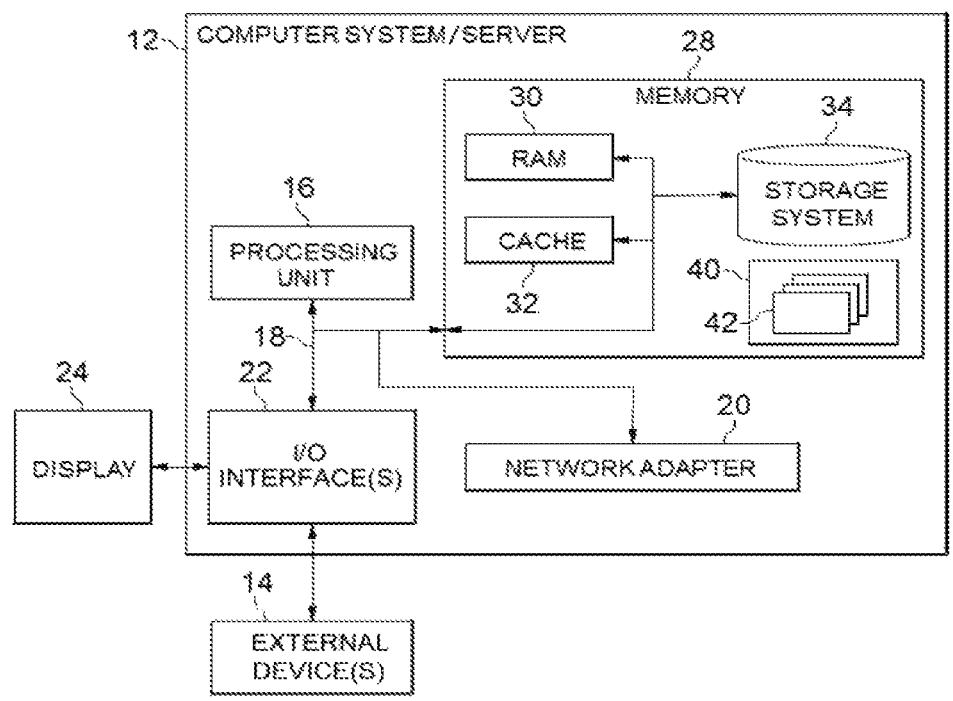
FIG. 1 depicts a cloud computing node according to one or more embodiments of the present invention.

Some embodiments will be described in more detail with reference to the accompanying drawings, in which the embodiments of the present disclosure have been illustrated. However, the present disclosure can be implemented in various manners, and Thus, should not be construed to be limited to the embodiments disclosed herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

A container image is used for building, shipping and running applications, which is used by Docker™, for example. The container image is a read-only template for building containers. A container is an instantiation of its corresponding container image. The container image is constructed by several layers. After a container is run, an overlay file system of its corresponding container image can be observed. The overlay file system of the container image makes it possible to start container in seconds. In addition, it is possible to share common layers between different container images, such that the container images can be transferred faster, and less disk space may be needed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model can include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand There is a sense of location independence in that the consumer generally has no control or knowledge over the exact location of the provided resources but can be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It can be managed by the organization or a third party and can exist on-premises or off-premises.

Community cloud: the cloud infrastructure is shared by several organizations and supports a specific community that has shared concerns (e.g., mission, security requirements, policy, and compliance considerations). It can be managed by the organizations or a third party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that can be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 can be described in the general context of computer system-executable instructions, such as program modules, being executed by a computer system. Generally, program modules can include routines, programs, objects, components, logic, data structures, and so on that perform particular tasks or implement particular abstract data types. Computer system/server 12 can be practiced in distributed cloud computing environments where tasks are performed by remote processing devices that are linked through a communications network. In a distributed cloud computing environment, program modules can be located in both local and remote computer system storage media including memory storage devices.

As shown in FIG. 1, computer system/server 12 in cloud computing node 10 is shown in the form of a general-purpose computing device. The components of computer system/server 12 can include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media can be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 can further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 can include at least one program product having a set (e.g., at least one) of program modules that are configured to carry out the functions of embodiments of the invention.

Program/utility 40, having a set (at least one) of program modules 42, can be stored in memory 28 by way of example, and not limitation, as well as an operating system, one or more application programs, other program modules, and program data. Each of the operating system, one or more application programs, other program modules, and program data or some combination thereof, can include an implementation of a networking environment. Program modules 42 generally carry out the functions and/or methodologies of embodiments of the invention as described herein.

Computer system/server 12 can also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
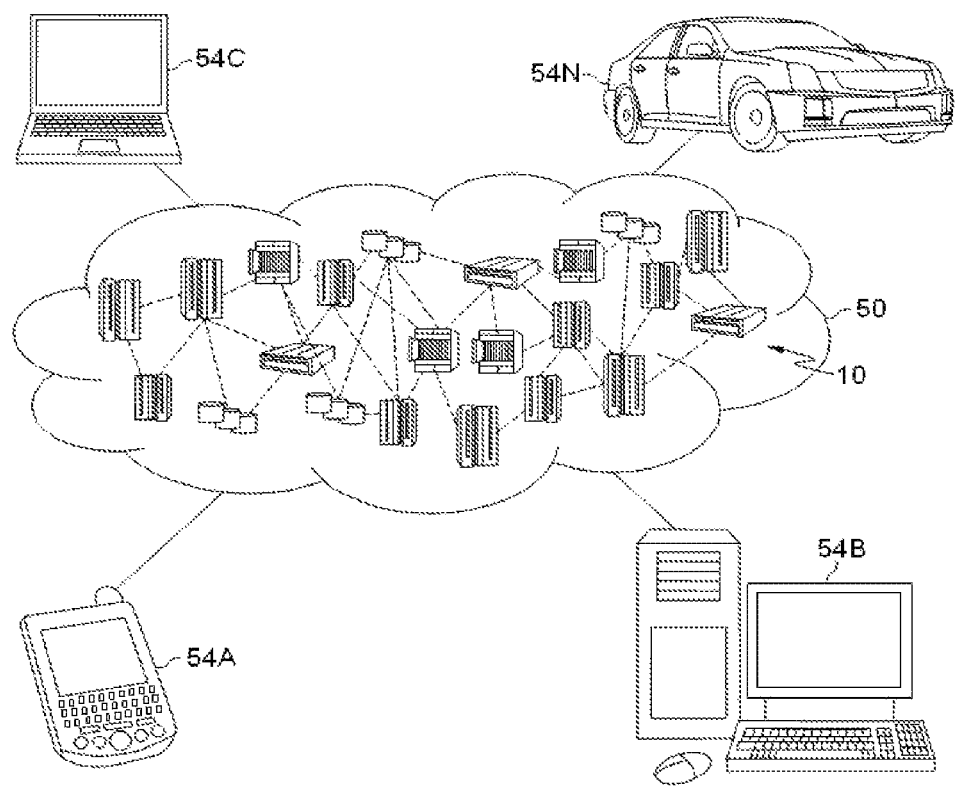
FIG. 2 depicts a cloud computing environment according to one or more embodiments of the present invention.

Referring now to FIG. 2, an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N can communicate. Nodes 10 can communicate with one another. They can be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
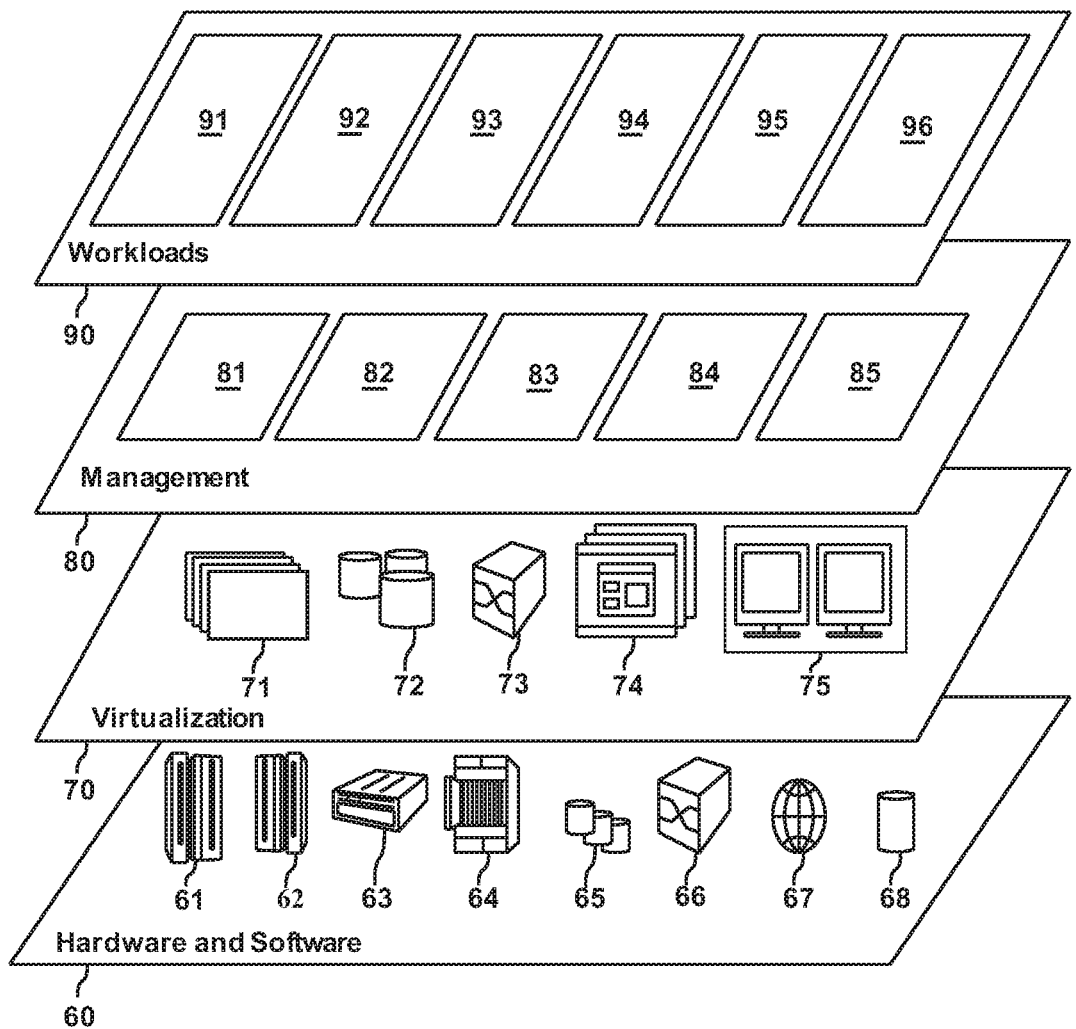
FIG. 3 depicts abstraction model layers according to one or more embodiments of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities can be provided: virtual servers 71; virtual storage 72; virtual networks 73, including virtual private networks; virtual applications and operating systems 74; and virtual clients 75.

In one example, management layer 80 can provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources can include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment can be utilized. Examples of workloads and functions which can be provided from this layer include: mapping and navigation 91; software development and lifecycle management 92; virtual classroom education delivery 93; data analytics processing 94; transaction processing 95; and optimization of container image 96.

The layers of some container images can be nonoptimized in practice. For example, in some container images, everything is in a single layer. Nowadays, some container images can be built arbitrarily. For example, for some container images, users can install and configure Java in an image layer, and install unrelated packages in another image layer. These container images cannot share a common image layer since their image layers are specifically customized. The arbitrarily built container images can slow down any Continuous Integration (CI)/Continuous Deployment (CD) process that involves an image transmission. The arbitrarily built container images can also slow down an image fetch process and Thus, can slow down an application startup process in container cluster. The arbitrarily built container images can result in disk space usage efficiency issues on image registries and hosts.

Figure 4:
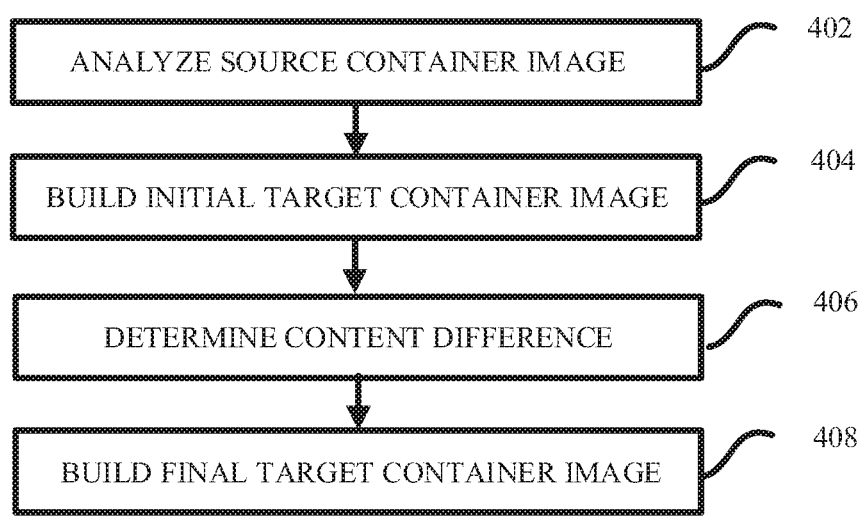
FIG. 4 depicts a schematic flowchart of a computer-implemented method facilitating optimization of a container image according to one or more embodiments of the present invention.

With reference now to FIG. 4, shown is a schematic flowchart of a computer-implemented method facilitating optimization of a container image according to one or more embodiments. The method can be implemented by the computer system/server 12 as shown in FIG. 1. The computer system/server 12 can be in a standalone apparatus, or it can be comprised in an image registry or a container orchestration engine. Hereinafter, a container image to be optimized is referred to as "source container image." An optimized container image obtained after the optimizing is referred to as "final target container image," whose content is the same as the content of the source container image. The final target container image comprises common image layers that can be shared.

In the method shown in FIG. 4, at block 402, a source container image can be analyzed to obtain a content of the source container image. In some embodiments, a source container instance can be generated based on the source container image. After running the source container instance, the source container instance can be analyzed to obtain the content of the source container image. The content of the source container image can illustrate the overlay file system of the source container image. The content of the source container image can comprise at least one of: an operating system (OS), an installed package or a first file not owned by any installed package.

At block 404, an initial target container image can be built using a set of base image layers based on the content of the source container image. In some embodiments, the set of base image layers can be obtained from a defined image layer knowledge base. The defined image layer knowledge base can comprise a plurality of base operating system (OS) layers (e.g., Ubuntu 16.04 and CentOS 7.3), and a plurality of base package group layers (e.g., gcc-ubuntu and gcc-centos). Since the plurality of base OS layers and the plurality of base package group layers are standard image layers (e.g., base image layers), they can be shared among a plurality of container images. It is noted that the set of base image layers can also comprise other image layers that can be shared among a plurality of container images. Thus, the initial target container image can be a rough version for building the final target container image, which has at least one base image layer. It is noted that the content of the initial target container image can be different from the content of the final target container image (i.e., the content of the source container image).

Then, at block 406, a content difference between the initial target container image and the source container image can be determined. In some embodiments, a source container instance can be generated based on the source container image. An initial target container instance can be generated based on the initial target container image. After running the source container instance and the initial target container instance, the source container instance can be compared with the initial target container instance to determine the content difference between the initial target container image and the source container image.

Next, at block 408, a final target container image can be built based on the initial target container image and the content difference. The final target container image has bottom image layers the same as the base image layers of the initial target container image. Then, one or more image layers can be added to the bottom image layers to include the content difference between the initial target container image and the source container image.

As can be observed from the above, the final target container image according to one or more of the embodiments of the present invention functions in the same way as the source container image. The final target container image contains the base image layers, which can be shared with other container images. Therefore, the final target container image can be an optimized container image with respect to the source container image.

Figure 5:
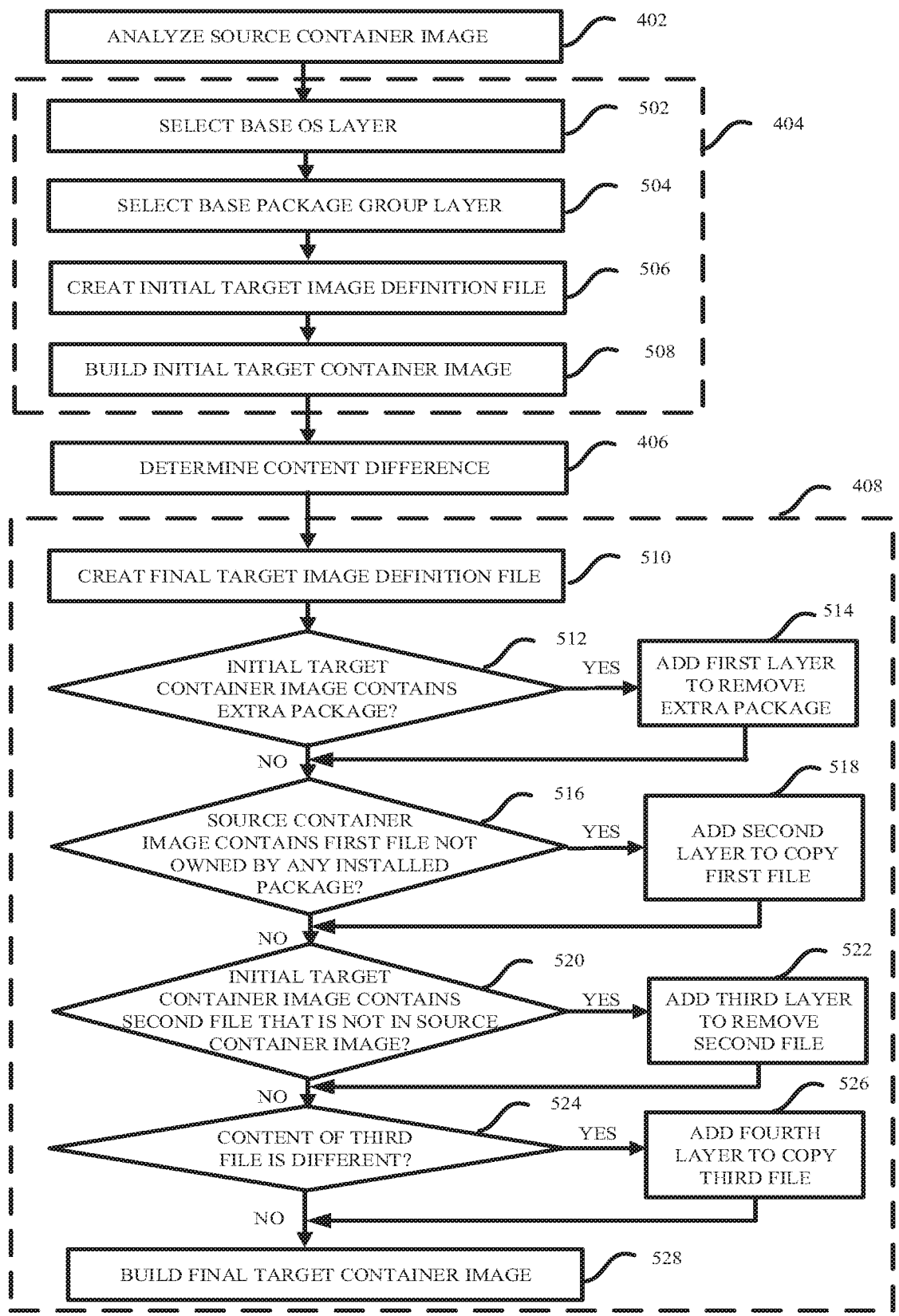
FIG. 5 depicts an example, non-limiting embodiment of the process to implement the computer-implemented method shown in FIG. 4.

FIG. 5 illustrates an example, non-limiting embodiment of the process to implement the computer-implemented method shown in FIG. 4. As shown in FIG. 4, after analyzing the source container image, the initial target container image can be built. The process of building the initial target container image is illustrated in blocks 502-508, as shown in FIG. 5. In this embodiment, the initial target container image and the final target container image can be built based on their corresponding image definition files.

At block 502, a base OS layer can be selected from the set of base image layers based on the OS of the source container image. In an example, the OS of the source container image can be Ubuntu 16.04, which is already known at block 402. Therefore, a base OS layer for Ubuntu 16.04 can be selected for building the initial target container image.

At block 504, a base package group layer can be selected from the set of base image layers based on the installed package in the source container image. For example, if a gcc package is installed in the source container image, a base package group layer for gcc is selected for building the initial target container image. In some embodiments, a head package of the installed package is obtained. The head package can generally be used to indicate major functions of the installed package. Therefore, the base package group layer having the same head package as that of the installed package is selected from the set of base image layers. In some embodiments, the source container image can have a plurality of installed packages. Thus, a plurality of corresponding base package group layers can be selected from the set of base image layers. In this context, "installed package" can refer to one installed package or a plurality of installed packages, and "base package group layer" can refer to one base package group layer or a plurality of base package group layers.

At block 506, an initial target image definition file can be created, which defines the base OS layer and the base package group layer. For example, in the initial target image definition file, a command to define the base OS layer can be "From Ubuntu: 16.04", and a command to define the base package group layer can be "apt-get -y install gcc".

At block 508, the initial target container image can be built based on the initial target image definition file. As shown in FIG. 4, after building the initial target container image, the content difference between the initial target container image and the source container image can be determined. The process of building the final target container image is further illustrated in blocks 510-528, as shown in FIG. 5.

At block 510, a final target image definition file can be created based on the initial target image definition file. In some embodiments, the commands in the initial target image definition file can be copied to the final target image definition file.

At block 512, it can be determined whether the content difference determined at block 406 indicates that the initial target container image contains an extra package that is not comprised in the source container image. If the initial target container image contains the extra package ("YES" at block 512), a first layer is added to the final target image definition file to remove the extra package, at block 514. Then, the process proceeds to block 516. If the initial target container image contains no extra package ("NO" at block 512), the process proceeds to block 516.

The source container image can contain a first file not owned by any installed package. Here, the first file can refer to the file(s) in the source container image but out of any installed package. It is determined whether the source container image contains the first file, at block 516. If the source container image contains the first file ("YES" at block 516), a second layer is added to the final target image definition file to copy the first file, at block 518. Then, the process proceeds to block 520. If the source container image does not contain the first file ("NO" at block 516), the process proceeds to block 520.

The source container image can remove one or more unnecessary files from its installed package. Since the initial target container image wholly adds the installed package in the source container image in the previous process, it can contain a removed file(s). At block 520, it is determined whether the content difference indicates that the initial target container image contains a second file that is not comprised in the source container image. Here, the second file refers to the file(s) in the initial target container image but out of the source container image. If the initial target container image contains the second file ("YES" at block 520), a third layer is added to the final target image definition file to remove the second file, at block 522. Then, the process proceeds to block 524. If the initial target container image does not contain the second file ("NO" at block 520), the process proceeds to block 524.

At block 524, it is determined whether the content difference indicates that a content of a third file in the source container image is different from that of the corresponding file in the initial target container image. Here, the third file refers to any file in the source container image. The corresponding file refers to a file having the same file name as the third file. If the content of the third file is different from that of the corresponding file ("YES" at block 524), a fourth layer is added to the final target image definition file to copy the third file, at block 526. Thus, the content of the corresponding file is replaced by the content of the third file. Then, the process proceeds to block 528. If the content of the third file is not different from that of the corresponding file ("NO" at block 524), the process proceeds to block 528. At block 528, the final target container image is built based on the final target image definition file.

It should be noted by those skilled in the art that the order of executing block 502 and block 504 can be reversed or parallel. It should also be noted by those skilled in the art that the order of executing block 512, block 516, block 520 and block 524 can not be as shown in FIG. 5. They can be executed in other order or in parallel.

Figure 6:
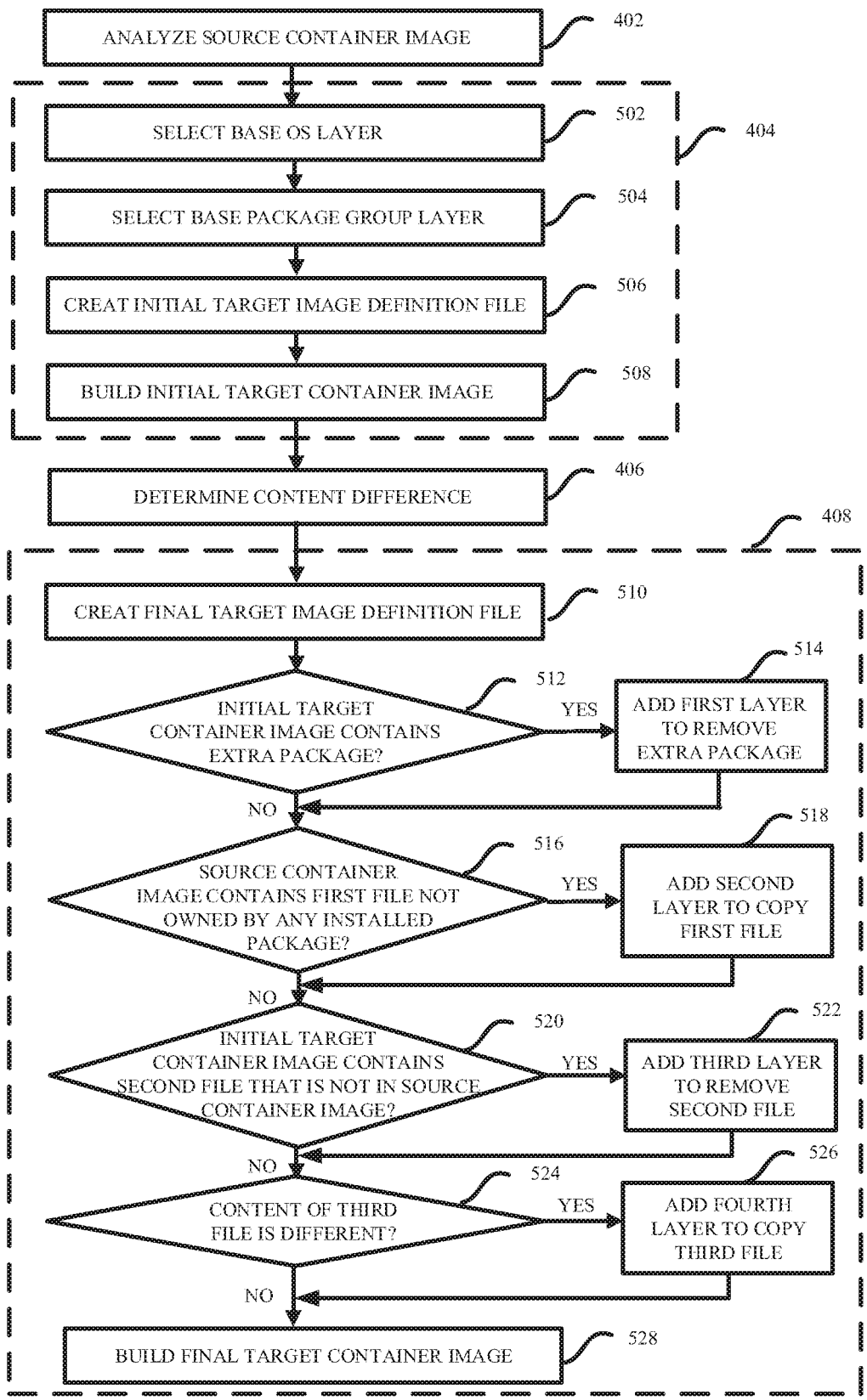
FIG. 6 depicts another example, non-limiting embodiment of the process to implement the computer-implemented method shown in FIG. 4.

FIG. 6 illustrates another example, non-limiting embodiment of the process to implement the computer-implemented method shown in FIG. 4. As shown in FIG. 4, after analyzing the source container image, the initial target container image can be built. The process of building the initial target container image is illustrated in blocks 602-616, as shown in FIG. 6. In this embodiment, the initial target container image and the final target container image are also built based on their corresponding image definition files.

At block 602, a base OS layer can be selected from the set of base image layers based on the OS of the source container image. The action executed at block 602 can be the same as the action executed at block 502 in FIG. 5.

At block 604, a base package group layer can be selected from the set of base image layers based on the installed package in the source container image. The action executed at block 604 can be the same as the action executed at block 504 in FIG. 5.

At block 606, an initial target image definition file can be created, which defines the base OS layer and the base package group layer. The action executed at block 606 can be the same as the action executed at block 506 in FIG. 5.

At block 608, it is determined whether the initial target container image contains the extra package that is not comprised in the source container image. If the initial target container image contains the extra package ("YES" at block 608), a first layer is added to the initial target image definition file to remove the extra package, at block 610. Then, the process proceeds to block 612. If the initial target container image contains no extra package ("NO" at block 608), the process proceeds to block 612.

As described above, the source container image can contain the first file not owned by any installed package. It is determined whether the source container image contains the first file, at block 612. If the source container image contains the first file ("YES" at block 612), a second layer is added to the initial target image definition file to copy the first file, at block 614. Then, the process proceeds to block 616. If the source container image does not contain the first file ("NO" at block 612), the process proceeds to block 616.

At block 616, the initial target container image is built based on the initial target image definition file. As shown in FIG. 4, after building the initial target container image, the content difference between the initial target container image and the source container image is determined. The process of building the final target container image is further illustrated in blocks 618-628, as shown in FIG. 6.

At block 618, a final target image definition file is created based on the initial target image definition file. The action executed at block 618 is the same as the action executed at block 510 in FIG. 5.

As described above, the source container image can remove one or more unnecessary files from its installed package. At block 620, it is determined whether the content difference determined at block 406 indicates that the initial target container image contains the second file that is not in comprised the source container image. If the initial target container image contains the second file ("YES" at block 620), a third layer is added to the final target image definition file to remove the second file, at block 622. Then, the process proceeds to block 624. If the initial target container image does not contain the second file ("NO" at block 620), the process proceeds to block 624.

At block 624, it is determined whether the content difference indicates that the content of the third file in the source container image is different from that of the corresponding file in the initial target container image. If the content of the third file is different from that of the corresponding file ("YES" at block 624), a fourth layer can be added to the final target image definition file to copy the third file, at block 626. Thus, the content of the corresponding file can be replaced by the content of the third file. Then, the process proceeds to block 628. If the content of the third file is not different from that of the corresponding file ("NO" at block 624), the process proceeds to block 628. At block 628, the final target container image can be built based on the final target image definition file.

It should be noted by those skilled in the art that the order of executing block 602 and block 604 can be reversed or parallel, the order of executing block 608 and block 612 can be reversed or parallel, and the order of executing block 620 and block 624 can be reversed or parallel.

Figure 7:
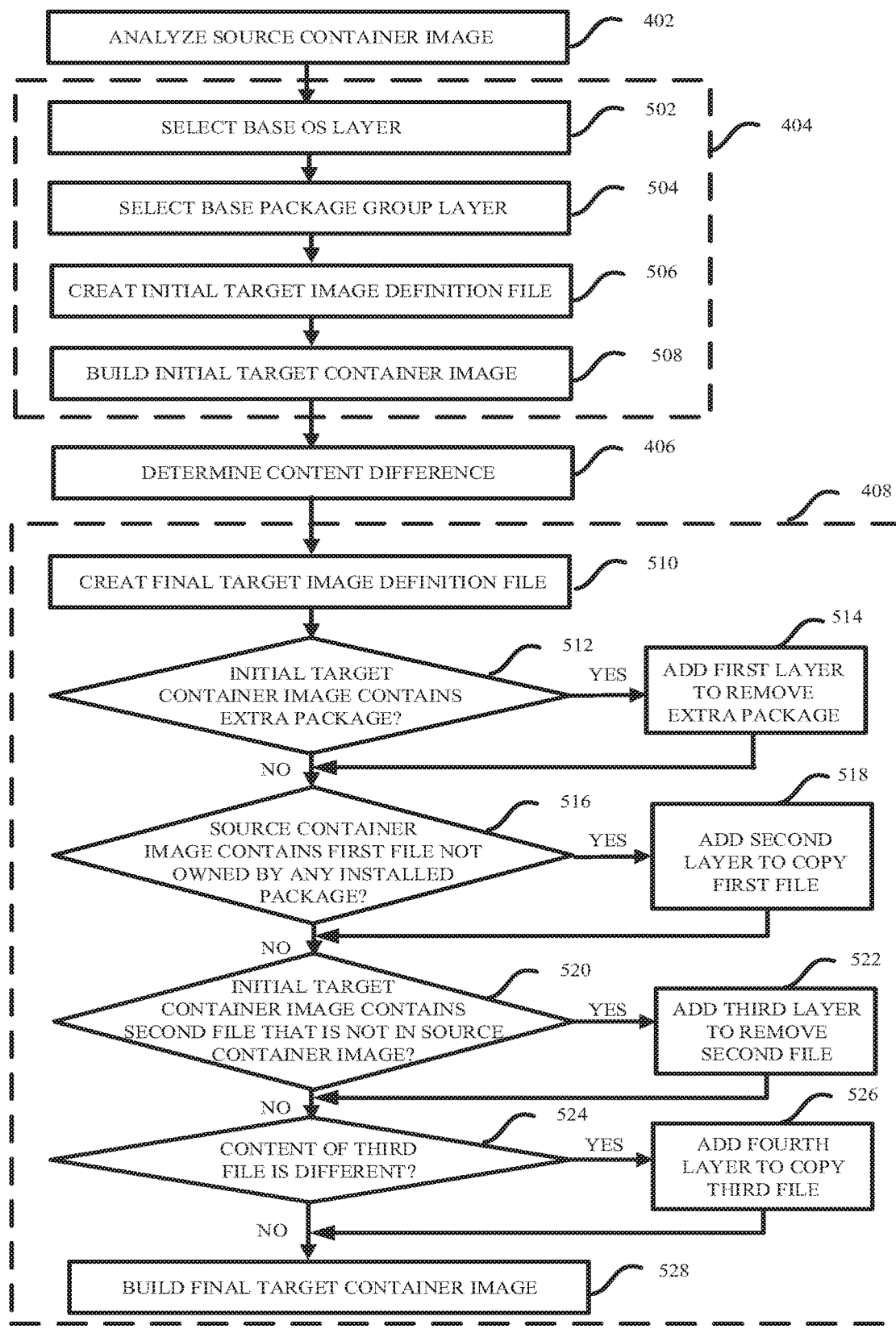
FIG. 7 depicts still another example, non-limiting embodiment of the process to implement the computer-implemented method shown in FIG. 4.

FIG. 7 illustrates still another example, non-limiting embodiment of the process to implement the computer-implemented method shown in FIG. 4. As shown in FIG. 4, after analyzing the source container image, the initial target container image can be built. The process of building the initial target container image is illustrated in blocks 702-706, as shown in FIG. 7. In this embodiment, the initial target container image and the final target container image can be built by stacking the image layers directly.

At block 702, a base OS layer can be selected from the set of base image layers based on the OS of the source container image. The action executed at block 702 can be the same as the action executed at block 502 in FIG. 5.

At block 704, a base package group layer can be selected from the set of base image layers based on the installed package in the source container image. The action executed at block 704 can be the same as the action executed at block 504 in FIG. 5.

At block 706, the initial target container image can be built by stacking the base package group layer on the base OS layer. As shown in FIG. 4, after building the initial target container image, the content difference between the initial target container image and the source container image can be determined. The process of building the final target container image is further illustrated in blocks 708-724, as shown in FIG. 7.

At block 708, it is determined whether the content difference determined at block 406 indicates that the initial target container image contains the extra package that is not comprised in the source container image. If the initial target container image contains the extra package ("YES" at block 708), a first layer can be stacked on the base package group layer of the initial target container image to remove the extra package, at block 710. Then, the process proceeds to block 712. If the initial target container image contains no extra package ("NO" at block 708), the process proceeds to block 712.

As described above, the source container image can contain the first file not owned by any installed package. It can be determined whether the source container image contains the first file, at block 712. If the source container image contains the first file ("YES" at block 712), a second layer can be stacked on the first layer to copy the first file, at block 714. If the first layer does not exist, the second layer can be stacked on the base package group layer. Then, the process proceeds to block 716. If the source container image does not contain the first file ("NO" at block 712), the process proceeds to block 716.

As described above, the source container image can remove one or more unnecessary files from its installed package. At block 716, it can be determined whether the content difference indicates that the initial target container image contains the second file that is not comprised in the source container image. If the initial target container image contains the second file ("YES" at block 716), a third layer can be stacked on the second layer to remove the second file, at block 718. If the second layer does not exist, the third layer can be stacked on the first layer. If the first layer also does not exist, the third layer can be stacked on the base package group layer. Then, the process proceeds to block 720. If the initial target container image does not contain the second file ("NO" at block 716), the process proceeds to block 720.

At block 720, it is determined whether the content difference indicates that the content of the third file in the source container image is different from that of the corresponding file in the initial target container image. If the content of the third file is different from that of the corresponding file ("YES" at block 720), a fourth layer can be stacked on the third layer to copy the third file, at block 722. Thus, the content of the corresponding file can be replaced by the content of the third file. If the third layer does not exist, the fourth layer can be stacked on the second layer. If the second layer does not exist, the fourth layer can be stacked on the first layer. If the first layer also does not exist, the fourth layer is stacked on the base package group layer. Then, the process proceeds to block 724, where the process ends. If the content of the third file is not different from that of the corresponding file ("NO" at block 720), the process proceeds to block 724.

It should be noted by those skilled in the art that the order of executing block 702 and block 704 can be reversed or parallel. It should also be noted by those skilled in the art that the order of executing block 708, block 712, block 716 and block 720 can not be as shown in FIG. 7. They can be executed in order or in parallel.

Figure 8:
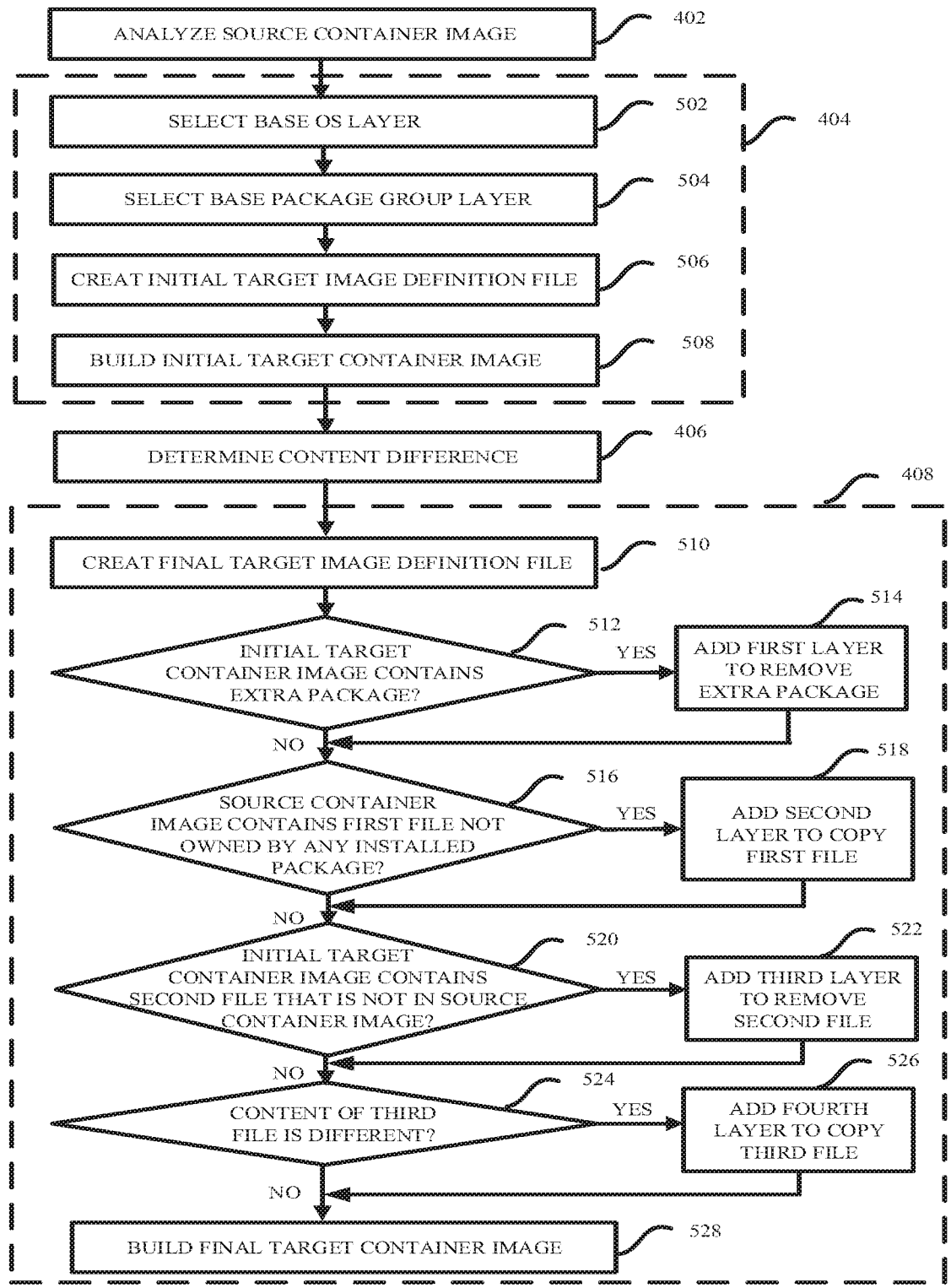
FIG. 8 depicts yet another example, non-limiting embodiment of the process to implement the computer-implemented method shown in FIG. 4.

FIG. 8 illustrates yet still another example, non-limiting embodiment of the process to implement the computer-implemented method shown in FIG. 4. As shown in FIG. 4, after analyzing the source container image, the initial target container image is built. The process of building the initial target container image is illustrated in blocks 802-814, as shown in FIG. 8. In this embodiment, the initial target container image and the final target container image are also built by stacking the image layers directly.

At block 802, a base OS layer can be selected from the set of base image layers based on the OS of the source container image. The action executed at block 802 can be the same as the action executed at block 502 in FIG. 5.

At block 804, a base package group layer can be selected from the set of base image layers based on the installed package in the source container image. The action executed at block 804 can be the same as the action executed at block 504 in FIG. 5. At block 806, the initial target container image can be built by stacking the base package group layer on the base OS layer.

At block 808, it is determined whether the initial target container image contains the extra package that is not comprised in the source container image. If the initial target container image contains the extra package ("YES" at block 808), a first layer can be stacked on the base package group layer to remove the extra package, at block 810. Then, the process proceeds to block 812. If the initial target container image contains no extra package ("NO" at block 808), the process proceeds to block 812.

As described above, the source container image can contain the first file not owned by any installed package. It is determined whether the source container image contains the first file, at block 812. If the source container image contains the first file ("YES" at block 812), a second layer can be stacked on the first layer to copy the first file, at block 814. If the first layer does not exist, the second layer is stacked on the base package group layer. Then, the process proceeds to block 406, which is already described in conjunction with FIG. 4. If the source container image does not contain the first file ("NO" at block 812), the process proceeds to block 406.

As shown in FIG. 4, after building the initial target container image at block 406, the content difference between the initial target container image and the source container image is determined. The process of building the final target container image is further illustrated in blocks 816-824, as shown in FIG. 8.

As described above, the source container image can remove one or more unnecessary files from its installed package. At block 816, it is determined whether the content difference determined at block 406 indicates that the initial target container image contains the second file that is not comprised in the source container image. If the initial target container image contains the second file ("YES" at block 816), a third layer can be stacked on the second layer to remove the second file, at block 818. If the second layer does not exist, the third layer can be stacked on the first layer. If the first layer also does not exist, the third layer is stacked on the base package group layer. Then, the process proceeds to block 820. If the initial target container image does not contain the second file ("NO" at block 816), the process proceeds to block 820.

At block 820, it is determined whether the content difference indicates that the content of the third file in the source container image is different from that of the corresponding file in the initial target container image. If the content of the third file is different from that of the corresponding file ("YES" at block 820), a fourth layer can be stacked on the third layer to copy the third file, at block 822. Thus, the content of the corresponding file is replaced by the content of the third file. If the third layer does not exist, the fourth layer can be stacked on the second layer. If the second layer does not exist, the fourth layer can be stacked on the first layer. If the first layer also does not exist, the fourth layer is stacked on the base package group layer. Then, the process proceeds to block 824, where the process ends. If the content of the third file is not different from that of the corresponding file ("NO" at block 820), the process proceeds to block 824.

It should be noted by those skilled in the art that the order of executing block 802 and block 804 can be reversed or block 802 and block 804 can be executed parallel, the order of executing block 808 and block 812 can be reversed or parallel, and the order of executing block 816 and block 820 can be reversed or parallel.

Under the same inventive concept, another embodiment of the present invention can provide a computer system that facilitates optimization of a container image. The apparatus can comprise one or more processors, a memory coupled to at least one of the processors, and a set of computer program instructions stored in the memory. The set of computer program instructions are executed by at least one of the processors to: analyze a source container image to obtain a content of the source container image; build an initial target container image using a set of base image layers, based on the content of the source container image; determine a content difference between the initial target container image and the source container image; and build a final target container image based on the initial target container image and the content difference.

Similarly, under the same inventive concept, another embodiment of the present invention can provide a computer program product. The computer program product comprises a computer readable storage medium having program instructions embodied therewith. The program instructions are executable by a processor to: analyze a source container image to obtain a content of the source container image; build an initial target container image using a set of base image layers, based on the content of the source container image; determine a content difference between the initial target container image and the source container image; and build a final target container image based on the initial target container image and the content difference.

One or more embodiments of the present invention can be a system, a method, and/or a computer program product. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams can represent a module, segment, or portion of code, which comprises one or more executable instructions for implementing the specified logical function(s). It should also be noted that, in some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method of building a final target container image as an optimized version of a source container image, comprising:
analyzing, by the one or more processing units, the source container image to obtain a content of the source container image;
building, by the one or more processing units, an initial target container image using a set of base image layers based on the content of the source container image;
determining, by the one or more processing units, a content difference between the initial target container image and the source container image; and
building, by the one or more processing units, a final target container image based on the initial target container image and the content difference, wherein the building the final target container image based on the initial target container image and the content difference comprises:
creating, by the one or more processing units, a final target image definition file based on the initial target image definition file;
generating, by the one or more processing units, a source container instance based on the source container image;
adding, in response to the content difference indicating that the initial target container image contains an extra package that is not comprised in the source container image, a first layer to the final target image definition file to remove the extra package by the one or more processing units;
adding, in response to the content difference indicating that the source container image contains the first file not owned by any installed package, a second layer to the final target image definition file to copy the first file by the one or more processing units;
adding, in response to the content difference indicating that the initial target container image contains a second file that is not comprised in the source container image, a third layer to the final target image definition file to remove the second file by the one or more processing units;
adding, in response to the content difference indicating that a content of a third file in the source container image being different from that of the corresponding file in the initial target container image, a fourth layer to the final target image definition file to copy the third file by the one or more processing units; and
building, by the one or more processing units, the final target container image based on the final target image definition file.

2. The computer-implemented method according to claim 1, wherein the analyzing the source container image to obtain the content of the source container image comprises:
running, by the one or more processing units, the source container instance; and analyzing, by the one or more processing units, the source container instance to obtain the content of the source container image.

3. The computer-implemented method of claim 1, wherein the content of the source container image comprises at least one of: an operating system (OS), an installed package or a first file not owned by any installed package.

4. The computer-implemented method of claim 3, wherein the building the initial target container image using the set of base image layers based on the content of the source container image further comprises:
 selecting, by the one or more processing units, a base OS layer from the set of base image layers based on the OS;
 selecting, by the one or more processing units, a base package group layer from the set of base image layers based on the installed package;
 creating, by the one or more processing units, an initial target image definition file which defines the base OS layer and the base package group layer; and
 building, by the one or more processing units, the initial target container image based on the initial target image definition file.

5. The computer-implemented method of claim 4, wherein the selecting the base package group layer from the set of base image layers based on the installed package comprises:
 obtaining, by the one or more processing units, a head package of the installed package; and
 selecting, by the one or more processing units, from the set of base image layers the base package group layer having the same head package as that of the installed package.

6. The computer-implemented method of claim 4, wherein the building the initial target container image using the set of base image layers based on the content of the source container image further comprises:
 adding, by the one or more processing units:
  a first layer to remove an extra package that is comprised in the base package group layer but not comprised in the source container image to the initial target image definition file, or
  a second layer to copy the first file not owned by any installed package but comprised in the source container image to the initial target image definition file.

7. The computer-implemented method of claim 3, wherein the building the initial target container image using the set of base image layers based on the content of the source container image comprises:
 selecting, by the one or more processing units, a base OS layer from the set of base image layers based on the OS;
 selecting, by the one or more processing units, a base package group layer from the set of base image layers based on the installed package; and
 stacking, by the one or more processing units, the base package group layer on the base OS layer.

8. The computer-implemented method of claim 7, wherein the selecting the base package group layer from the set of base image layers based on the installed package comprises:
 obtaining, by the one or more processing units, a head package of the installed package; and
 selecting, by the one or more processing units, from the set of base image layers the base package group layer having the same head package as that of the installed package.

9. The computer-implemented method of claim 7, wherein the building the final target container image based on the initial target container image and the content difference further comprises:
 stacking, in response to the content difference indicating that the initial target container image contains an extra package that is not comprised in the source container image, a first layer on the base package group layer of the initial target container image to remove the extra package by the one or more processing units;
 stacking, in response to the content difference indicating that the source container image contains a first file not owned by any installed package, a second layer on the first layer to copy the first file by the one or more processing units;
 stacking, in response to the content difference indicating that the initial target container image contains a second file that is not comprised in the source container image, a third layer on the second layer to remove the second file by the one or more processing units; and
 stacking, in response to the content difference indicating that a content of a third file in the source container image being different from that of the corresponding file in the initial target container image, a fourth layer on the second layer to copy the third file by the one or more processing units.

10. The computer-implemented method of claim 7, wherein the building the initial target container image using the set of base image layers based on the content of the source container image further comprise:
 stacking, by the one or more processing units:
  a first layer on the base package group layer to remove an extra package that is comprised in the base package group layer but not comprised in the source container image, or
  a second layer on the first layer to copy the first file not owned by any installed package but comprised in the source container image.

11. The computer-implemented method of claim 10, wherein the building the final target container image based on the initial target container image and the content difference further comprises:
 stacking, in response to the content difference indicating that the initial target container image contains a second file that is not comprised in the source container image, a third layer on the second layer to remove the second file by the one or more processing units; and
 stacking, in response to the content difference indicating that a content of a third file in the source container image being different from that of the corresponding file in the initial target container image, a fourth layer on the second layer of the initial target container image to copy the third file by the one or more processing units.

12. The computer-implemented method of claim 1, wherein the determining the content difference between the initial target container image and the source container image comprises:
 generating, by the one or more processing units, a source container instance based on the source container image;
 generating, by the one or more processing units, an initial target container instance based on the initial target container image;
 running, by the one or more processing units, the source container instance and the initial target container instance; and
 comparing, by the one or more processing units, the source container instance with the initial target container instance to determine the content difference.

13. A computer system to build a final target container image as an optimized version of a source container image comprising:
- a memory that stores computer executable components; and
- a processor, operably coupled to the memory, and that executes the computer executable components stored in the memory, wherein the computer executable components comprise: at least one computer-executable component that:
- analyzes a source container image to obtain a content of the source container image; builds an initial target container image using a set of base image layers, based on the content of the source container image;
- determines a content difference between the initial target container image and the source container image; and
- builds a final target container image based on the initial target container image and the content difference, wherein the building the final target container image based on the initial target container image and the content difference comprises:
- creation, by the processor, of a final target image definition file based on the initial target image definition file;
- generating, by the one or more processing units, a source container instance based on the source container image;
- an adding, in response to the content difference indicating that the initial target container image contains an extra package that is not comprised in the source container image, a first layer to the final target image definition file to remove the extra package by the processor;
- an adding, in response to the content difference indicating that the source container image contains the first file not owned by any installed package, a second layer to the final target image definition file to copy the first file by the processor;
- an adding, in response to the content difference indicating that the initial target container image contains a second file that is not comprised in the source container image, a third layer to the final target image definition file to remove the second file by the processor;
- an adding, in response to the content difference indicating that a content of a third file in the source container image being different from that of the corresponding file in the initial target container image, a fourth layer to the final target image definition file to copy the third file by the processor; and
- a building, by the processor, of the final target container image based on the final target image definition file.

14. The computer system of claim 13, wherein the content of the source container image comprises at least one of: an operating system (OS), an installed package or a first file not owned by any installed package.

15. The computer system of claim 14, wherein a building the initial target container image using the set of base image layers, based on the content of the source container image comprises:
- selection of a base OS layer from the set of base image layers based on the OS;
- selection of a base package group layer from the set of base image layers based on the installed package;
- creation of an initial target image definition file which defines the base OS layer and the base package group layer; and
- a building the initial target container image based on the initial target image definition file.

16. The computer system of claim 15, wherein the building the initial target container image using the set of base image layers, based on the content of the source container image further comprises:
- an adding of:
  - a first layer to remove an extra package that is comprised in the base package group layer but not comprised in the source container image to the initial target image definition file, or
  - a second layer to copy the first file not owned by any installed package but comprised in the source container image to the initial target image definition file.

17. A computer program product facilitating optimization of a source container image via generation of a final container image, the computer program product comprising a computer readable storage medium having program instructions embodied therewith, the program instructions executable by a processor to cause the processor to:
- analyze, by the processor, the source container image to obtain a content of the source container image;
- build, by the processor, an initial target container image using a set of base image layers, based on the content of the source container image;
- determine, by the processor, a content difference between the initial target container image and the source container image; and
- build, by the processor, a final target container image based on the initial target container image and the content difference, wherein the building the final target container image based on the initial target container image and the content difference comprises:
- creation, by the processor, of a final target image definition file based on the initial target image definition file;
- generating, by the one or more processing units, a source container instance based on the source container image;
- an adding, in response to the content difference indicating that the initial target container image contains an extra package that is not comprised in the source container image, a first layer to the final target image definition file to remove the extra package by the processor;
- an adding, in response to the content difference indicating that the source container image contains the first file not owned by any installed package, a second layer to the final target image definition file to copy the first file by the processor;
- an adding, in response to the content difference indicating that the initial target container image contains a second file that is not comprised in the source container image, a third layer to the final target image definition file to remove the second file by the processor;
- an adding, in response to the content difference indicating that a content of a third file in the source container image being different from that of the corresponding file in the initial target container image, a fourth layer to the final target image definition file to copy the third file by the processor; and
- a building, by the processor, of the final target container image based on the final target image definition file.

* * * * *